United States Patent
Malm

[19]

[11] Patent Number: 6,164,890

[45] Date of Patent: Dec. 26, 2000

[54] TRUMPET-SHAPED AUTOMOTIVE TRIM FASTENER

[75] Inventor: Douglas N. Malm, Northville, Mich.

[73] Assignee: The Standard Products Company, Cleveland, Ohio

[21] Appl. No.: 09/151,751

[22] Filed: Sep. 14, 1998

[51] Int. Cl.[7] .............................. F16B 19/00; E04C 2/38
[52] U.S. Cl. ................... 411/508; 411/171; 52/716.5; 52/718.02; 52/718.03; 24/297
[58] Field of Search ........................ 411/171, 84, 508; 52/716.5, 718.03, 718.02, 718.01; 24/297, 289

[56] References Cited

U.S. PATENT DOCUMENTS

| | | |
|---|---|---|
| 3,020,987 | 2/1962 | Schaurte . |
| 3,140,738 | 7/1964 | Johnson . |
| 3,841,044 | 10/1974 | Brown . |
| 3,842,565 | 10/1974 | Brown . |
| 4,364,591 | 12/1982 | Bien . |
| 4,780,035 | 10/1988 | Shibayama et al. . |
| 4,824,304 | 4/1989 | Shibayama et al. . |
| 4,878,791 | 11/1989 | Kurihara et al. . |
| 5,030,051 | 7/1991 | Kaneko et al. . |
| 5,407,311 | 4/1995 | Goss . |
| 5,756,185 | 5/1998 | Lesser . |
| 5,795,118 | 8/1998 | Osada . |
| 5,824,974 | 10/1998 | Campbell . |

*Primary Examiner*—Flemming Saether

[57] ABSTRACT

A generally trumpet-shaped fastener includes a generally circular flange portion flared outwardly from an elongated pin portion. The fastener is hollow and open at the flange portion and the opposite end of the pin portion, thus allowing air to escape during securement of the fastener to an attachment member that is to be held in place on a base member by the fastener. In addition, a number of discrete ridges or other protuberances are formed on the outer side of the flange portion in order to enhance the engagement and securement of the flange portion of the fastener to the underside of an attachment member, either by integrally molding or by ultrasonic welding.

18 Claims, 1 Drawing Sheet

U.S. Patent    Dec. 26, 2000    6,164,890
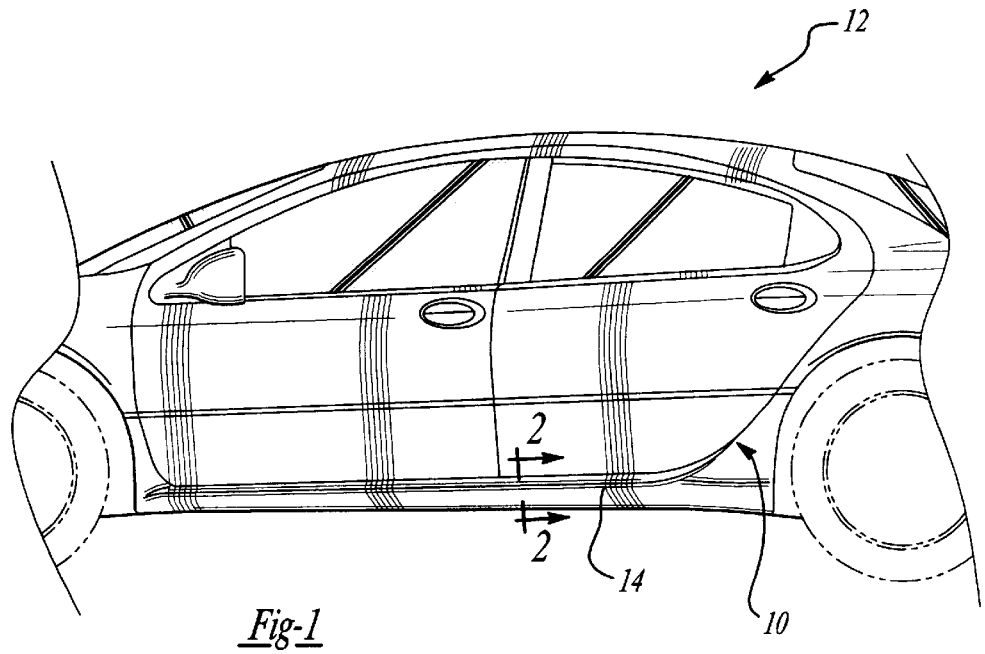
Fig-1
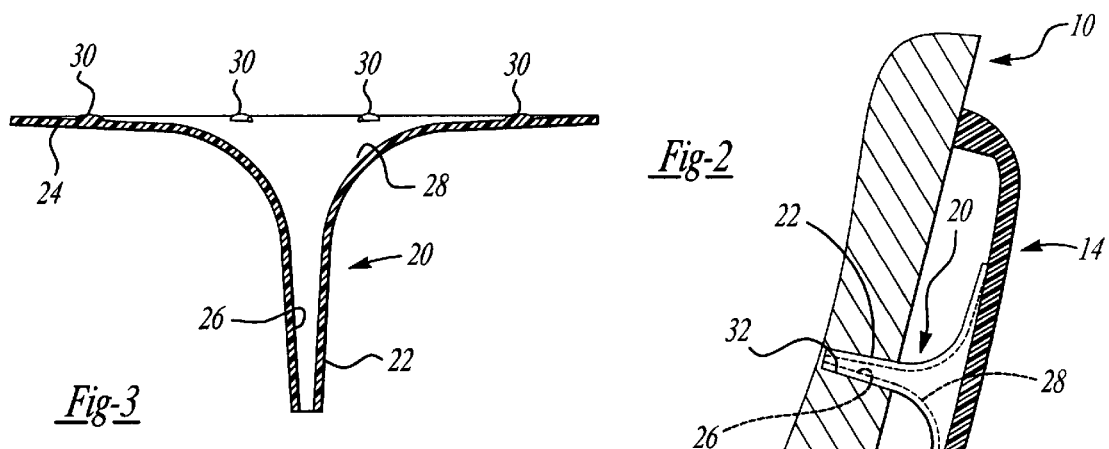
Fig-3
Fig-2
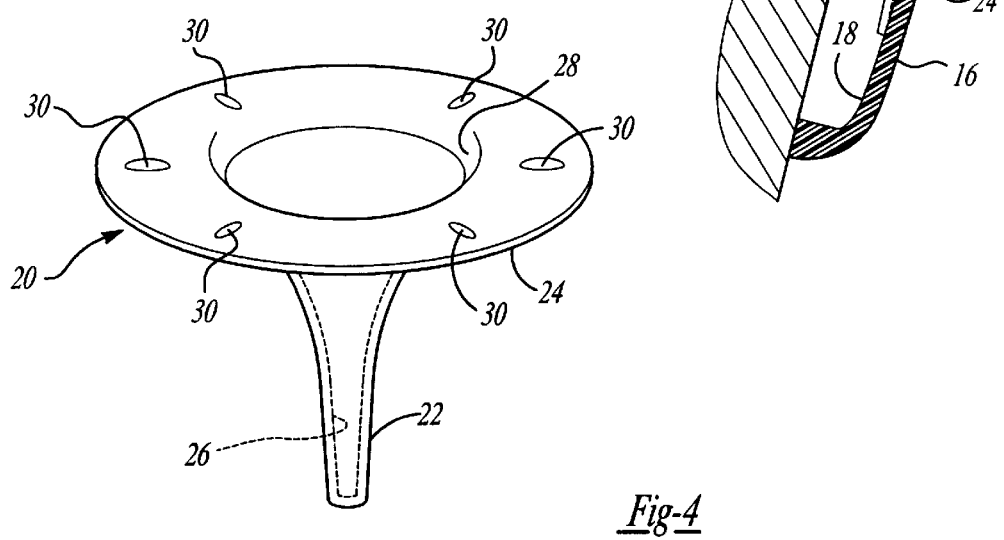
Fig-4

TRUMPET-SHAPED AUTOMOTIVE TRIM FASTENER

BACKGROUND AND SUMMARY OF THE INVENTION

The present invention relates generally to fasteners, and more specifically such fasteners used in attaching automotive fascia panels or trim strips to a portion of an automotive body.

Automotive vehicles frequently have one or more trim strips, fascia panels or other such decorative attachment members secured to portions of the vehicle body. Such attachment members have been secured to vehicle bodies in a wide variety of different ways, including by way of male fasteners secured to the underside of the attachment member and being received in an opening in the vehicle body. Such attachment fasteners have generally performed reasonably well in the past, but have often been disadvantageous in terms of high cost or the lack of sufficient flexibility to allow the attachment members to tightly conform to irregular vehicle body surface shapes. Such previous fasteners have often proved troublesome by allowing air to be entrapped between a portion of the fastener and the attachment member, thus in turn weakening the securement of the attachment member to the vehicle body.

Accordingly, the present invention seeks to provide an automotive trim or panel fastener that is simple and inexpensive both to produce and to secure to the trim strip, fascia panel or other attachment member, that is thin and flexible enough to conform itself to the underside of the attachment member and to thus allow the attachment member to conform itself to irregular vehicle body shapes, and that provides for a secure attachment to the trim strip, fascia panel or other such attachment member.

According to the present invention, a fastener for securing an attachment member to the surface of a base member includes an elongated generally trumpet-shaped pin portion and a flange portion, with the flange portion being flared laterally outwardly from one end of the trumpet-shaped pin portion. The flange and pin portions have hollow interiors that are in communication with one another, with the hollow interior of the flange portion being open in a longitudinal direction away from the pin portion, and with the hollow interior of the pin portion being open at the opposite end of the pin portion. The flanged portion is adapted to be secured to the attachment member, such as by being integrally molding it to the attachment member, or by way of an ultrasonic welding securement. Preferably, a number of discrete protuberances, such as laterally outwardly-extending ribs, are formed on the outer side of the flange portion, opposite that of the the pin portion. Such discrete ribs or ridges frictionally engage the attachment member during ultrasonic welding in order to concentrate the heat generated thereby, thus melting the ridges and/or the areas around them and thereby forming a more secure attachment. The open hollow interiors of the flange portion and the pin portion allow air to escape from between the flange portion and the attachment member during either ultrasonic welding or during integrally molding the flange portion into the attachment member, thus ensuring a secure attachment.

Additional objects, advantages and features of the present invention will become apparent from the following description and the appended claims, taken in conjunction with the accompanying drawings.

BRIEF DESCRIPTION OF THE DRAWINGS

FIG. 1 is an elevational side view of a portion of an automotive vehicle, illustrating a trim or fascia panel member secured to a portion of the vehicle body.

FIG. 2 is a cross-sectional view, taken generally along line 2—2 of FIG. 1.

FIG. 3 is a longitudinal cross-sectional view of the fastener used to secure the trim or fascia panel member to the vehicle body in FIGS. 1 and 2.

FIG. 4 is a perspective view of the fastener of FIG. 3.

DETAILED DESCRIPTION OF THE PREFERRED EMBODIMENTS

FIGS. 1 through 4 depict an exemplary male fastener for attaching an automotive trim strip or panel member, for example, to the surface of a vehicular body. One skilled in the art will readily recognize from the following discussion that fasteners according to the present invention can be equally applicable in other fastening environments, and can be of a variety of shapes other than those depicted in the drawings merely for purposes of illustration.

In FIGS. 1 and 2, a vehicle 10 includes a body 12 having a trim strip, fascia panel member, or other such attachment member 14 secured thereto. The attachment member 14 has an external side 16 facing outwardly away from the body 12 and an internal side 18 facing inwardly toward the surface of the body 12.

The trim, fascia, or other attachment member 14 is secured to the vehicle body 12 by way of a fastener 20, as shown in FIGS. 2 through 4. The fastener 20 has a diverging generally trumpet-shaped pin portion 22 flaring outwardly at one end into a flange portion 24 to form an overall trumpet-shaped fastener configuration. The pin portion 22 has an open hollow interior that is in communication with an open hollow interior of the flange portion 28. This open-ended configuration prevents air from being entrapped between the flange portion 24 and the attachment member 14 during securement of the fastener 20 thereto. The flange portion 24 is preferably sufficiently thin and flexible to allow it to conform to the underside 18 of the attachment member 14, as well as allowing the attachment member 14 to in turn be sufficiently flexible to conform to the outer surface shape of the vehicle body 12.

Preferably, the fastener 20 is composed of a thin, flexible plastic or other synthetic material and has a number of discrete, radially outwardly-extending ridges 30 (or other such discontinuities or protuberances) on its outer surface side opposite that of the pin portion 22. The discrete ridges 30 are spaced apart from one another along the flange portion 24 to allow air to escape during securement to the attachment member 14, and to provide for increased friction and resultant localized melting of the ridges, the areas around them (and even the attachment member) during ultrasonic welding, for example, of the flange portion 24 to the attachment member 14. Alternatively, the flange portion 24 can be integrally molded into the attachment member 14, in which case the ridges 30 provide for a more secure, non-rotating engagement of the flange portion 24 with the attachment member 14.

As can be seen in FIG. 2, once the fastener 20 has been secured (either by ultrasonic welding or by integrally molding) to the attachment member 14, the assembly can be secured to the vehicle body 12 by way of the pin portion 22 being received within an opening 32 in the vehicle body. Such attachment can be further secured either by a tight, press-fit of the pin portion 22 in the opening 32, or by way of adhesives bonding the pin portion 22 to the body 12.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

What is claimed is:

1. A fastener for securing an attachment member to the surface of a base member, said fastener having an elongated pin portion and a flange portion, said flange portion being flared laterally outwardly from a first end of said elongated pin portion, said flange portion and said pin portion each having a hollow interior, said hollow interior of said flange portion and said pin portion being in communication with one another, said hollow interior of said flange portion being open in a longitudinal direction away from said pin portion, and said hollow interior of said pin portion being open in an outward longitudinal direction at a second end thereof opposite said first end thereof, said flanged portion being adapted to be secured to the attachment member, and said second end being adapted to be received in an opening in the base member, said hollow interior portions of said flange member and said pin member allowing air between the attachment member and said flange portion to escape therethrough, said flange portion having a number of discrete protuberances spaced apart on an outer side thereof facing longitudinally away from said pin portion for engaging said attachment member, said flange portion being circular disk-shaped, said pin portion being generally cylindrical at said second end and of a generally trumpet-shape flaring outwardly at said first end into said circular disk-shaped flange portion, said flange portion having a number of discrete protuberances.

2. A fastener according to claim 1, wherein said protuberances are discrete ribs extending laterally outwardly on said outer side of said flange portion in outward lateral directions away from said pin portion.

3. A fastener according to claim 1, wherein said fastener is secured to the attachment member by ultrasonic welding of said flange portion thereto, said protuberances being adapted for frictionally engaging the attachment member during said ultrasonic welding in order to concentrate heat generated during said ultrasonic welding.

4. A fastener according to claim 3, wherein said protuberances are discrete ribs extending laterally outwardly on said outer side of said flange portion in outward lateral directions away from said pin portion.

5. A fastener according to claim 1, wherein said fastener is secured to the attachment member by ultrasonic welding of said flange portion thereto, said protuberances frictionally engaging the attachment member during said ultrasonic welding in order to concentrate heat generated during said ultrasonic welding.

6. A fastener according to claim 5, wherein said protuberances are discrete ribs extending laterally outwardly on said outer side of said flange portion in outward lateral directions away from said pin portion.

7. A fastener according to claim 6, wherein said fastener is adapted for securing a fascia panel to the surface of a portion of a vehicle body.

8. A fastener according to claim 6, wherein said fastener is adapted for securing an automotive trim strip to the surface of a portion of a vehicle body.

9. A fastener according to claim 1, wherein said fastener flange portion is adapted to be integrally molded with a molded attachment member.

10. A fastener according to claim 9, wherein said fastener is adapted for securing a fascia panel to the surface of a portion of a vehicle body.

11. A fastener according to claim 9, wherein said fastener is adapted for securing an automotive trim strip to the surface of a portion of a vehicle body.

12. A fastener for securing an attachment member to the surface of a portion of an automotive body, said fastener having an elongated generally trumpet-shaped pin portion and a generally circular disk-shaped flange portion, said flange portion being flared radially outwardly from a first end of said elongated pin portion, said generally trumpet-shaped pin portion flaring outwardly at said first end into said circular disk-shaped flange portion, said circular flange portion and said pin portion each having a hollow interior, said hollow interior of said flange portion and said pin portion being in communication with one another, said hollow interior of said flange portion being open in a longitudinal direction away from said pin portion, and said hollow interior of said pin portion being open in an outward longitudinal direction at a second end thereof opposite said first end thereof, said flanged portion being adapted to be secured to an underside of the attachment member, and said second end being adapted to be received in an opening in the vehicle body, said hollow interior portions of said flange member and said pin member allowing air between the attachment member and said flange portion to escape therethrough as said flange portion is secured to the attachment member, said flange portion having a member of discrete ridges spaced apart on an outer side thereof facing longitudinally away from said pin portion for engaging said attachment member, said discrete ridges extending radially outwardly on said outer side of said flange portion in outward radial directions away from said pin portion.

13. A fastener according to claim 12, wherein said fastener is adapted to be secured to the attachment member by ultrasonic welding of said flange portion thereto, said ridges being adapted for frictionally engaging the attachment member during said ultrasonic welding in order to concentrate heat generated during said ultrasonic welding.

14. A fastener according to claim 13, wherein said fastener is adapted for securing a fascia panel to the automotive body.

15. A fastener according to claim 13, wherein said fastener is adapted for securing an automotive trim strip to the automotive body.

16. A fastener according to claim 12, wherein said fastener flange portion is adapted to be integrally molded with said molded attachment member.

17. A fastener according to claim 16, wherein said fastener is adapted for securing a fascia panel to the automotive body.

18. A fastener according to claim 16, wherein said fastener is adapted for securing an automotive trim strip to the automotive body.

* * * * *